Patented Dec. 18, 1934

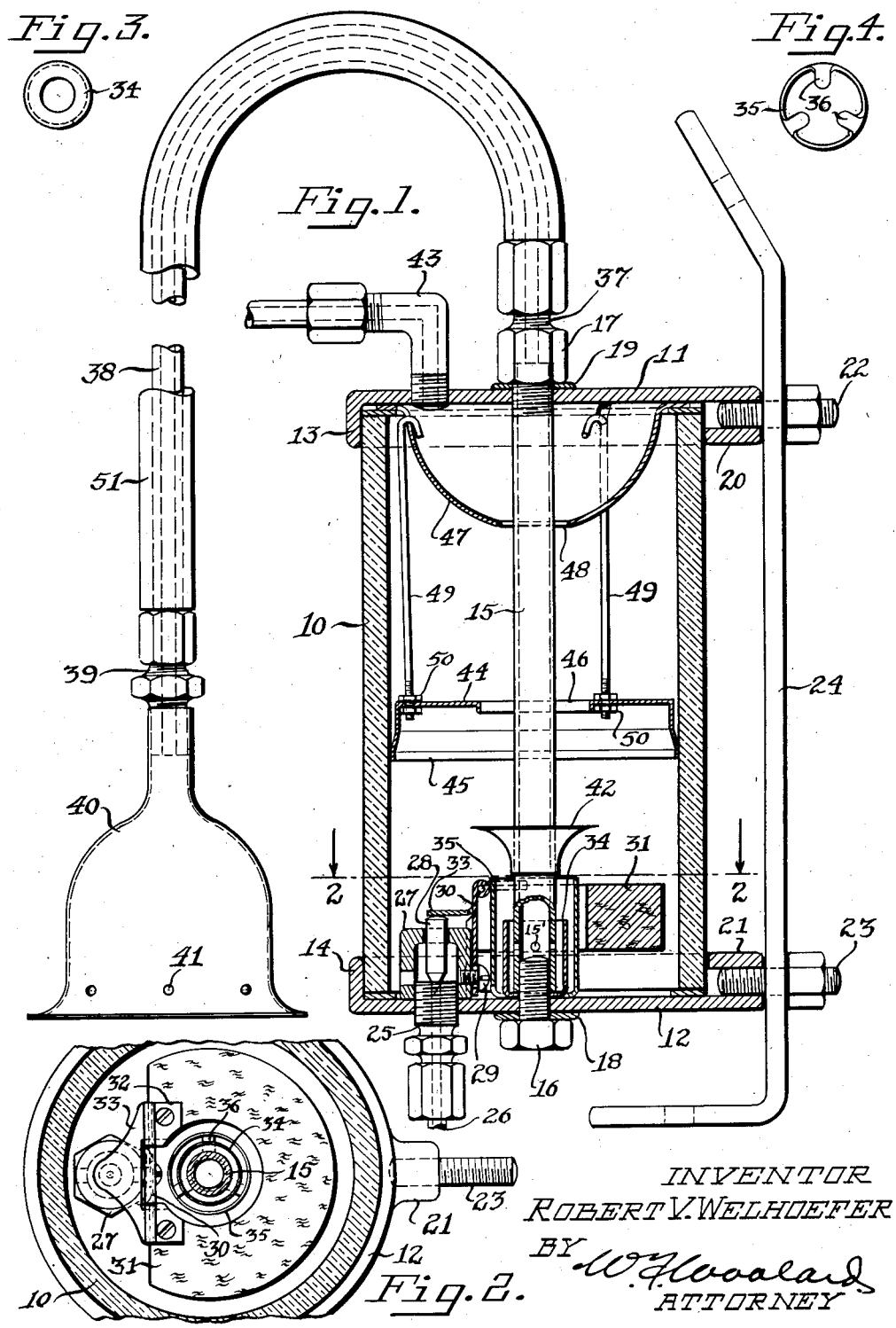

1,984,716

UNITED STATES PATENT OFFICE 1,984,716

GASEOUS FUEL GENERATOR

Robert V. Welhoefer, Waterloo, Wis.

Refiled for abandoned application Serial No. 626,182, July 29, 1932. This application December 4, 1933, Serial No. 700,834

3 Claims. (Cl. 261—124)

This application is a substitute for my prior application, Serial No. 700,834, filed December 4, 1933.

My invention relates to devices for generating a fuel compound for use in internal combustion engines, in which devices a stream of air is passed through a body of gasoline to become saturated with the vapors of the latter. The atmosphere when thus charged with a fuel content possesses a very high explosive quality, and is completely combustible, without residue. Practice of my invention in connection with the operation of an automobile, achieves great reduction in the amount of gasoline consumed, and enables a greater mileage to be attained, with a given quantity of the raw fuel used. The invention resides in an attachment applicable to any type of power plant in which an internal combustion engine is used.

Such invention is embodied in a tubular or cylindrical chamber closed at both ends, in which is arranged a float and valve to control the quantity of gasoline admitted to the cylinder to maintain a desired level of raw fuel. Air from the outside is conducted by a tube extending from the top of the chamber and discharged into the gasoline supply at the bottom thereof, so as to impregnate the stream of air with the vapors of the gasoline. An outlet leading from the chamber conducts the saturated atmosphere to the intake manifold of the engine, by which it is distributed to the firing chambers of the engine.

The submerged lower end of the air inlet tube is shielded so as to break the force of the incoming stream of air, and prevent displacement of the body of gasoline in the chamber, and just above the outlet end of the tube, the latter is provided with a deflector or breaker which is formed so as to direct the spray against the inner walls of the chamber, to break up the raw fuel and effect a more thorough saturation of the stream of air.

The chamber is provided upon its inside with a baffle of peculiar construction, against which the gasoline agitated by the passage of the atmosphere therethrough will be thrown, and which serves to restrain the splashing gasoline from entering into the upper part of the chamber, and from being drawn into the intake manifold, with the result that only a small quantity of the raw fuel is consumed in the operation of producing the gaseous fuel compound.

A second baffle, arranged above that first described, supplements the action of the latter, and serves as a further check upon the passage of raw fuel from the cylinder.

Means are provided for attaching the free end of the air inlet tube to the exhaust manifold, or other part of the engine, so as to heat the stream of air before it is passed into the gasoline in the chamber.

These, and other novel features of construction will now be described in connection with the accompanying drawing, and in the claims appended hereto, I have set forth the novelty residing in the invention.

In the accompanying drawing:

Figure 1 is a vertical central sectional view of a device constructed in accordance with my invention, parts thereof being shown in full lines.

Fig. 2 is a transverse sectional view on the line 2—2, Fig. 1, looking in the direction of the arrows.

Fig. 3 is a bottom plan view of the inner member of the shield used to break the force of the incoming stream of air; and Fig. 4 is a bottom plan view of the outer member of the shield, and showing means whereby it is held in concentric position and providing for the circulation of gasoline therethrough.

In the drawing, the numeral 10 indicates a tubular or cylindrical chamber, elongated in about the proportions shown, and preferably constructed of glass, although obviously such chamber may be made of any suitable, impervious material. The ends of the chamber are closed by caps 11 and 12, provided with opposed circular flanges 13 and 14, forming recesses in which the ends of the chamber are entered. Gaskets applied to the ends of the chamber and confined by the caps 11 and 12, serve to seal the chamber against leakage at the joints.

The caps 11 and 12 are provided with axially aligned bores. The bore in the cap 11 is passed over the externally threaded upper end of a tube 15, the purposes of which will hereinafter be described. The lower end of the tube 15 is shown as threaded interiorly and the threads are adapted to be engaged by a headed screw 16, passed through the bore in the cap 12. A nut 17 is threaded upon the projecting upper end of the tube 15, so that when the screw 16 and nut 17 are engaged with the tube 15, the latter will be placed under tension, and the caps 11 and 12 will be maintained in sealing position upon the chamber 10. Washers 18 and 19 may take the thrust of the screw 16 and the nut 17, by bearing upon the outer sides of the caps 11 and 12.

The caps 11 and 12 are provided with outwardly extending bosses 20 and 21, which are bored radially and threaded for the reception of screws 22 and 23, the said screws being passed through spaced openings in a bracket 24, of any suitable form, by which the device may be supported in suitable position in relation to the engine which it is to serve.

A nipple 25 threaded at one end is engaged in a bore in the cap 12, and connected at its other end by a small duct 26, leading from the gasoline tank, or other raw fuel supply. A crown nut 27 is threaded upon the end of the nipple projecting at the inside of the cap 12, the crown of the nut being bored to receive the pin 28 of a needle valve, the point of which co-operates with the bore of the nipple. The nut 27 is transversely bored and threaded for the reception of a screw 29, passed through an opening in the plate 30 of a hinge upon which the float 31 is mounted, the screw 29 being accessible through the bore in the boss 21. The other hinge plate 32 is attached to the float 31, and is provided with a rearwardly extending finger 33, the tip end of which rests upon the pin 28, and serves to close the needle valve against the admission of gasoline into the chamber 10, when the float 31 is buoyed by the body of gasoline already in the chamber.

Near its lower end, and just above the end of the screw 16, the tube 15 is provided with a plurality of perforations 15', opening into the inner member 34 of the shield. The lower end of the member 34 is provided with an opening having the diameter of the screw 16, so that when the lower end of the tube 15 is inserted in the member 34, the tube will rest upon the bottom of the latter, and be clamped in position by the action of the screw. The second member 35 of the shield is a short tubular member provided at its lower end with inturned fingers 36, on which the bottom of the member 34 is adapted to rest, and maintain the member 35 in concentric relation with the member 34. The float 31 is provided with a central opening, somewhat larger than the diameter of the member 35, so as to allow the necessary rocking movement of the float. The shield also protects the float from being disturbed by the air pressure.

The nut 17 is provided upon one side with a projecting nipple 37, to which is coupled a tube 38, attached at its other end by means of a threaded connection 39, to a bell 40. The latter may by any suitable means be attached to the exhaust manifold or other heat radiating part of the engine. The bell 40 is provided with a plurality of perforations 41, the purpose of which is to admit a volume of outside air to the bell, so that such air may be preheated and then conducted through the connections described to the tube 15, and discharged therefrom through perforations 15', into the body of gasoline in the lower part of the chamber 10. The inrush of air is due to the suction of the engine, and when discharged produces a violent agitation of the body of gasoline in the chamber. The draft thus induced would be sufficient to displace the body of gasoline, and defeat the purposes of the invention were it not for the interpositioning of the shield, as before described, which serves to break the force of the incoming stream of air. By thus checking the draft, the body of gasoline is considerably stabilized, and an opportunity is afforded for a more thorough charging of the incoming atmosphere with the vapors of the gasoline. To prevent the incoming air from blowing the gasoline too far upwardly with respect to the chamber 10, I provide upon the tube 15, slightly above the shield, a deflector or breaker 42 of inverted conical form, which serves to deflect the gasoline from its upward course, and dash it against the inside wall of the chamber, thus agitating and breaking up the gasoline so that the asmosphere commingling with the latter may become better saturated with the vapors of the gasoline.

An outlet connection 43 through the cap 11, will permit the passage of the charged atmosphere from the chamber 10, to the intake manifold of the engine, connection between the outlet 43 and the manifold being made at any suitable point on the latter. A check valve should be placed in the oulet 43, to prevent back-firing.

To restrain the undue splashing of the gasoline, and confine it substantially to a lower portion of the chamber, I insert about midway of the chamber a flat baffle 44, having a depending circular flange 45, of a diameter about equal to that of the inside of the chamber, and engaged loosely with the wall of the chamber. The center of the baffle 44 is cut away to provide a flanged circular opening 46, through which the charged atmosphere may rise around the tube 15, in the suction of the engine. A second baffle 47, in the form of a bowl having a circular opening 48 at its center may be supported by its flanged rim at the upper end of the chamber 10, and clamped in position by the cap 11. The outgoing charged atmosphere will pass through the circular openings 46 and 48, around the tube, and out from the chamber through the outlet 43. Any of the unabsorbed liquid fuel which may pass the baffles will work back into the bottom of the chamber 10. I have shown the baffle 44 as supported from the baffle 47 by means of a plurality of links 40, having hooks at their upper ends which enter openings near the rim of the baffle 47. The lower ends of the links 49 are passed through perforations in the baffle 44, and the latter is maintained in proper position by jamb nuts 50, threaded on the depending ends of the links 49. The baffle 44 may be supported from its underside. The inlet tube 38 may be covered with an asbestos or other heat conserving jacket 51, as may also be the outlet 43.

In the construction and operation of my device, the flow of raw fuel through the inlet 26, is governed by the float controlled valve, so as to maintain a constant quantity in the chamber. The stream of air drawn through the tube 15, and discharged from the lower end of the latter into the body of gasoline, agitates such gasoline so violently that the stream of air becomes impregnated with the vapors of the gasoline, and is thus provided with a fuel content having a powerful explosive quality. The combustion of this saturated atmosphere is complete, and there is no carbon deposit from the same. Considerable use of my invention in connection with the operation of an automobile, establishes a superior mileage, with a resultant decrease in the cost of fuel.

Having thus described my invention, what I claim and desire to secure by Letters Patent of the United States, is:

1. A gaseous fuel generator for use in internal combustion engines, such generator comprising a chamber adapted to contain a quantity of gasoline, means for conducting gasoline into the said chamber, and means for controlling the inflow of gasoline to maintain a level of the latter in the chamber, an air inlet tube for passing an outside air stream through the gasoline in the chamber to effect saturation of the air stream with the vapors of the gasoline, a tubular shield at the lower end of the tube to break the force of the air stream and prevent displacement of body of gasoline, a deflector in the form of an inverted cone carried by the said tube acting to dash the gasoline against the inner wall of the chamber, and means for conducting the gas charged air to the firing chambers of an engine.

2. A gaseous fuel generator for use in internal combustion engines, such generator comprising a chamber adapted to contain a quantity of gasoline, means for conducting gasoline into the said chamber, and means for controlling the inflow of gasoline to maintain a level of the latter in the chamber, an air inlet tube for passing an outside air stream through the gasoline in the chamber to effect saturation of the air stream with the vapors of the gasoline, a shield at the lower end of the tube to break the force of the air stream and prevent displacement of body of gasoline, a deflector in the form of an inverted cone carried by the said tube acting to dash the gasoline against the chamber wall, a baffle thereover to arrest the splashing of the gasoline, and means for conducting the gas charged air to the firing chambers of an engine.

3. In a device of the character described a liquid fuel container having an air outlet, means for maintaining a body of liquid fuel at a predetermined level in said container, an auxiliary chamber within said container partially submerged within and communicating with the body of liquid fuel thus maintained, said chamber having a top opening, means for conducting air to said chamber, means within said chamber for directing the air received from said conductor upwardly through the fuel in said chamber to form a fuel spray above said chamber, and means above said chamber for diverting the fuel spray thus formed laterally of said container.

ROBERT V. WELHOEFER.